US009708929B2

(12) United States Patent
Szwedowicz et al.

(10) Patent No.: US 9,708,929 B2
(45) Date of Patent: Jul. 18, 2017

(54) METHOD AND DEVICE FOR SUPPRESSING THE FORMATION OF ICE ON STRUCTURES AT THE AIR INTAKE OF A TURBOMACHINE

(71) Applicant: ALSTOM Technology Ltd, Baden (CH)

(72) Inventors: Jaroslaw Leszek Szwedowicz, Bad Zurzach (CH); Andreas Bauer, Baden (CH); Marcus Neubauer, Hannover (DE); Sebastian Marc Schwarzendahl, Hannover (DE)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 352 days.

(21) Appl. No.: 14/306,314

(22) Filed: Jun. 17, 2014

(65) Prior Publication Data
US 2014/0366552 A1 Dec. 18, 2014

(30) Foreign Application Priority Data
Jun. 18, 2013 (EP) ..................................... 13172501

(51) Int. Cl.
*F01D 25/02* (2006.01)
*F02C 7/04* (2006.01)
(Continued)

(52) U.S. Cl.
CPC .............. *F01D 25/02* (2013.01); *F02C 7/047* (2013.01); *F03G 7/08* (2013.01); *F05D 2260/407* (2013.01); *F25C 5/08* (2013.01)

(58) Field of Classification Search
CPC .... F01D 25/02; F01D 25/10; F05D 2260/407; F02C 7/047; F25C 5/08; B64D 15/00–15/22; B64D 2033/0233
See application file for complete search history.

(56) References Cited

U.S. PATENT DOCUMENTS 2,754,398 A * 7/1956 Rainbow ................. F02C 7/047
219/201
4,732,351 A 3/1988 Bird
(Continued)

FOREIGN PATENT DOCUMENTS

CH 704 127 5/2012
EP 0 926 387 6/1999
(Continued)

OTHER PUBLICATIONS

Office Action issued on Aug. 19, 2015, by the Russian Patent Office in corresponding Russian Patent Application No. 2014123528/06, and an English Translation of the Office Action. (10 pages).

*Primary Examiner* — Pascal M Bui Pho
*Assistant Examiner* — Rene Ford
(74) *Attorney, Agent, or Firm* — Buchanan Ingersoll & Rooney PC (57) ABSTRACT

The application relates to a method and a device for suppressing ice formation on intake structures of a compressor, particularly the compressor of a gas turbine. The technical aim of the present invention is to provide a method and a device for suppressing the formation of ice on said structures, which avoid the disadvantages of known solutions, such as a reduction of the performance of the gas turbine, and have a simple and broad applicability. According to the present invention the mechanical vibratory energy of said structures during operation is converted into electrical energy by a piezoelectric element, firmly applied to said structure, and in a connected electrical circuit the generated electrical energy is then converted into thermal energy by an ohmic resistor and this thermal energy is conducted to at least a portion of the structure for suppressing ice formation. Excess energy may be transmitted by a transmitter to other circuits in adjacent structures.

25 Claims, 4 Drawing Sheets

(51) Int. Cl.
*F03G 7/08* (2006.01)
*F02C 7/047* (2006.01)
*F25C 5/08* (2006.01)

(56) References Cited

U.S. PATENT DOCUMENTS

| | | | | |
|---|---|---|---|---|
| 5,281,091 | A * | 1/1994 | Dooley | F02C 7/047 244/134 D |
| 5,775,715 | A * | 7/1998 | Vandergrift | A63C 9/00 280/602 |
| 6,095,547 | A * | 8/2000 | Vandergrift | A63C 5/075 280/602 |
| 7,246,480 | B2 | 7/2007 | Ritland | |
| 8,006,934 | B2 * | 8/2011 | Alexander | F02C 7/047 219/526 |
| 8,049,147 | B2 * | 11/2011 | Hogate | B64D 33/02 219/205 |
| 8,599,082 | B2 * | 12/2013 | Mitchell | F01D 17/02 343/720 |
| 2005/0008482 | A1 * | 1/2005 | Allford | F01D 17/162 415/175 |
| 2005/0198967 | A1 * | 9/2005 | Subramanian | C23C 4/18 60/803 |
| 2007/0007827 | A1 * | 1/2007 | Harris | H02K 35/04 310/15 |
| 2007/0187381 | A1 * | 8/2007 | Vontell | F01D 5/18 219/202 |
| 2008/0041842 | A1 * | 2/2008 | Alexander | F01D 9/065 219/541 |
| 2008/0054645 | A1 * | 3/2008 | Kulkarni | F01D 15/10 290/52 |
| 2008/0100180 | A1 * | 5/2008 | Clingman | H02N 2/186 310/339 |
| 2008/0149619 | A1 * | 6/2008 | Vontell | F01D 5/147 219/444.1 |
| 2009/0127976 | A1 * | 5/2009 | Ward | F03G 7/08 310/319 |
| 2012/0126665 | A1 | 5/2012 | Szwedowicz et al. | |
| 2013/0327756 | A1 * | 12/2013 | Clemen, Jr. | B64D 15/20 219/202 |

FOREIGN PATENT DOCUMENTS

| | | |
|---|---|---|
| EP | 1 422 440 | 5/2004 |
| EP | 2 433 868 | 3/2012 |
| GB | 2472053 | 1/2011 |

\* cited by examiner

METHOD AND DEVICE FOR SUPPRESSING THE FORMATION OF ICE ON STRUCTURES AT THE AIR INTAKE OF A TURBOMACHINE

CROSS-REFERENCE TO RELATED APPLICATIONS

This application claims priority to European application 13172501.2 filed Jun. 18, 2013, the contents of which are hereby incorporated in its entirety.

TECHNICAL FIELD

The present invention relates to the technical field of systems for suppressing the formation of ice on structures in the air intake section of a turbomachine, particularly an axial compressor of a gas turbine.

BACKGROUND

Gas turbines for vehicles or stationary plants are customarily equipped with a compressor, which draws ambient air and raises its pressure to a relatively high level in accordance with the design requirements of the combustion process of the gas turbine. The compressed air is then directed into a combustor, mixed with fuel therein and ignited. The compressed high-energy combustion gases from the combustor flow into the turbine, where they are expanded, performing mechanical work. Axial or radial compressors are used.

While the temperature of the air raises, when compressed, in the air intake system of the compressor the pressure firstly drops and then increases behind the first compressor stage. From this reason, at particular low ambient temperature the dew point temperature of air may be reached and on the surfaces of the intake structures ice forms itself from the condensing of moisture. This ice-forming mechanism usually occurs in cold regions of the world. Ice mainly forms on the stator parts of the compressor intake (bellmouth), on the inlet guide vanes (IGV) and partly on the rotor blades of the first stage. Behind the first compressor stage air temperature rapidly increases, thus protecting the components of the downstream compressor rows from ice formation. The presence of ice on the surface of these structures leads to an additional pressure drop, what results into a performance loss of the gas turbine plant. In a worse case, pieces of ice detach from the surface, e.g. of the inlet guide vanes and cause damages, particularly with the rotor blades of the first compressor stage.

Hence there is a need for a solution of effectively suppressing the formation of ice on said structure elements or, if ice deposits already have been formed on the surface, to remove those ice deposits and to prevent their reformation.

Various systems for suppressing ice-formation or such for removing ice deposits are known in the technical field of compressor operation.

The dew point temperatures of gas-vapor-mixtures are available from psychrometric charts. Following these data two types of sensors are usually applied that either monitor the condition of ice creation or detect ice building-up.

A known solution for protecting the external surfaces of the structures at the compressor intake from icing, practically used in the field of stationary gas turbine power plants, comprise a compressor bleed anti-icing system (i.e. to bleed hot air from the compressor and convey it to the intake area for heating) or applying a hot water heat exchanger system or arranging resistive heating elements to a stator wall in the intake section.

However, the drawbacks of those systems are a reduction of the performance of the gas turbine (losses up to 0.3%), the requirement of additional investment costs, special monitoring systems, costly maintainability and a limited applicability. In field experience the building-up process of ice on the first compressor stage can take a few seconds before the anti-icing system starts to operate effectively.

U.S. Pat. No. 4,732,351 discloses a device for suppressing the formation of ice on the external surface of various articles, particularly aircraft structures. According to this solution a piezoelectric material is applied to the relevant surface, which has to be kept ice free. An available power source is adapted so that, whatever the source, it is converted into an alternating current. A microprocessor is provided that, in accordance with the relevant parameters of the material used, a current of proper amplitude, duration, wave length and shape is received, which will realize the amount of movement for deformation of the piezoelectric material necessary to prevent ice formation. This ice-suppression or ice-removing mechanism is based on the forced vibration of the piezoelectric material itself. This device requires electrical power adhered to a target structure. The electrical power is conventionally supplied via electric wires.

It is a well-known phenomenon that during operation of a compressor synchronous and asynchronous vibrations of the rotating blades are generated due to aerodynamic effects. Resonances in the blade may lead to significant problems like vibratory crack formation which constitutes a critical type of failure for compressor blades.

CH 704127 discloses a solution of damping blade vibrations in turbomachines by using the piezoelectric effect. This solution is based on the concept of converting the mechanical vibratory energy of the vibrating blade into electrical energy and afterwards to convert this generated electrical energy into heat loss. And this first step of converting mechanical energy into electrical energy is realized by using the piezoelectric effect, namely by firm installation of at least one piezoelectric element into the blade to be damped. As a result of blade vibrations the piezoelectric element is deformed, thereby generating an electrical voltage. By integrating said element into an electrical network with an ohmic resistor the generated electric voltage induces an electrical current producing ohmic heat loss in the connected network.

SUMMARY

The technical aim of the present invention is to provide a method and a device for suppressing the formation of ice on the surface of intake structures of a turbomachine, particularly a compressor of a gas turbine, which avoid the disadvantages of known solutions and have a simple and broad applicability.

An aspect of the present invention includes the suppression of ice formation on the surface of a structure, namely an intake structure of a compressor by using the vibration characteristics of said structure for generating electrical energy by a piezoelectric element and to convert this electrical energy into thermal energy and to use this thermal energy to suppress the formation of ice on this structure.

According to another aspect of this invention the vibration of a first structure, namely a rotating structure, is used to generate electrical energy by a piezoelectric element and to transmit at least a part of this energy by contactless energy transfer directly or indirectly to a second structure, particularly a non-rotating structure, to convert the transmitted energy into thermal energy and to use it to suppress the formation of ice on that second structure.

According to a preferred embodiment the rotating structure are the rotating blades of the first compressor stage, and the second structure are the inlet guide vanes and/or stator parts of the bellmouth.

According to another embodiment the vibration characteristics of a rotating structure are used to generate an electrical signal by a piezoelectric element, this signal is transmitted to an external energy delivery system. Based on this signal an electrical energy is generated, this electrical energy is transmitted by contactless energy transfer to at least one or all non-rotating and/or rotating structures, which have to be kept ice free. In the receiving structures the transmitted energy is converted into thermal energy for suppressing ice formation on these structures.

According to a preferred embodiment the conversion of electrical energy into thermal energy is effected by an ohmic resistance.

Another aspect of the present invention includes a piezoelectric element to be applied to a structure, namely an intake structure of a compressor, for generating electrical energy from mechanical energy, and to convert this electrical energy into thermal energy for suppressing the formation of ice on a surface of this structure.

According to a preferred embodiment the piezoelectric element is connected to an electrical circuit and this electrical circuit additionally comprises at least an ohmic resistor and/or a transmitter.

According to another aspect of the invention an electrical circuit, at least comprising an piezoelectric element, an ohmic resistor and a transmitter, is applied to a first structure, and an electrical circuit, at least comprising a receiver and an ohmic resistor, is applied to a second structure, wherein the transmitter of the first structure and the receiver of the second structure are designed for contactless energy transfer.

Preferably the first structure is a rotating structure, particularly the rotating blades of the first stage, and the second structure is a non-rotating structure, such as the inlet guide vanes and/or stator parts of the bellmouth.

According to another aspect of the present invention a part of the rotating structure is equipped with an electrical circuit comprising a piezoelectric element, an ohmic resistor and a transmitter, the transmitter is designed to send a signal to an external energy delivery system, the external energy delivery system, comprising a receiver for receiving said signal, an electrical power source for power supply and a transmitter for contactless energy transfer to a receiver, wherein at least one, preferably all structures to be kept free of ice, are equipped with an electrical circuit, at least comprising a receiver to receive electrical energy from the external energy delivery system by contactless energy transfer and an ohmic resistor for converting the received energy into thermal energy for warming said structures.

According to yet another aspect more than one piezoelectric elements are applied to an individual structure, wherein said more than one piezoelectric elements are adjusted to one or more resonance frequencies. This measure enables the use of different resonance frequencies of the "iced" structures.

BRIEF DESCRIPTION OF THE DRAWINGS

Further characteristics and advantages of the invention will be more apparent from the description of preferred embodiments of the invention illustrated by way of non-limiting example in the accompanying drawings.

DETAILED DESCRIPTION

Figure 1:
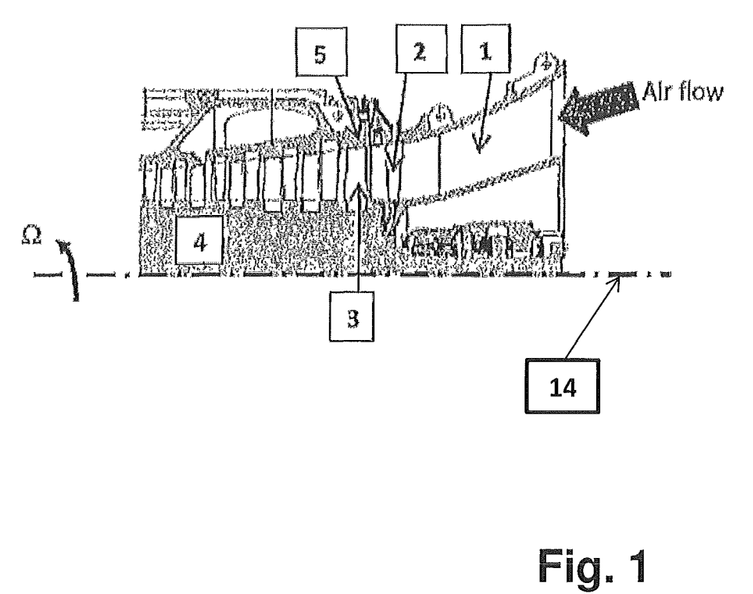
FIG. 1 is a schematic view of an intake of an axial compressor according to the state of the art.

FIG. 1 schematically shows the intake section of an axial compressor of a gas turbine plant comprising a casing 5 and a rotor 4, surrounded by said casing 5. Rotor 4 rotates around a longitudinal axis 14. Between an inner contour of the casing 5 and an outer contour of the rotor 4 an annular flow channel is formed. Rotating blades, connected to the rotor 4, and guide vanes, connected to the casing 5 project alternatingly into this flow channel. Reference 2 in FIG. 1 refers to the inlet guide vanes and reference 3 refers to the rotating blades of the first compressor stage. Via the bellmouth 1 ambient air enters the compressor. Additional components, like a filtration system and struts may be arranged in this section.

Under nominal operation conditions of the compressor at a rotational speed $\Omega$ of the rotor 4 the rotating compressor disc assemblies are designed as resonance free system in terms of harmonic rotational excitations $k\Omega$, where k means the engine order varying 1, 2, 3, ... ∞. The rotational excitation determines a non-uniform air pressure distribution along the circumferential direction of the compressor bladed discs. At the compressor intake, that pressure variation is mainly caused by an asymmetrical geometry of the intake, the number of bellmouth struts and of inlet guide vanes 2 as well as other sources like, for instance, ovalization of the compressor casing 5. In addition, the rotating blades 3 can be excited by non-synchronic stimulation, like acoustic excitation, which rather occurs rarely. In the design process the Campbell diagram is used to identify possible excitation of a rotating bladed disc. Moreover, depending on the design guidelines the non-synchronic excitation could also be considered on the Campbell diagram. In the Campbell diagram at the nominal speed $\Omega_n$, the blade eigenfrequency $\omega_1$, of the mode shape i must be located in between the synchronic and non-synchronic excitation lines to avoid resonances. Usually the rotating blades are designed to operate free of resonance up to the $6^{th}$ or even higher engine order k. The non-rotating vanes 2 could be excited by non-synchronic stimulation, if the excitation frequency e is equal to $\omega_{vi}$ natural frequency of the mode shape i as excitation criterion of freestanding blades and vanes.

As mentioned in the description before, ice mainly deposits on the surfaces of the bellmouth 1, the inlet guide vanes 2 and less on the rotating blades 3 of the first compressor stage. With respect to the blade vibration ice distributed on these structures increases their overall mass by $\Delta m$ and reduces the eigenfrequency $\omega_{i\Delta m}$ as $$\omega_{i,\Delta m} = \frac{1}{2\pi}\sqrt{\frac{k_i}{m_i + \Delta m}},$$

wherein $k_i$ and $m_i$ denote effective stiffness and mass involved in vibration of the mode shape i that can be determined with the known analytical formulas for the fundamental mode shape i=1, in which the blade is represented as one degree of freedom by equivalent spring-mass system. For mode shapes higher than 1 the Finite Element Method (FEM) can be applied and then the blade frequency with ice is given by $$\omega_{i,\Delta m} = \frac{1}{2\pi}\sqrt{\frac{k_i}{m_{i,M+\Delta m}}}, i > 1.$$

In the FEM theory the effective modal stiffness and mass participating in vibration of the mode shape i are expressed by $$k_i = \{\phi_i\}^T [K(x,y,z)]\{\phi_i\}$$

$$m_{i,M+\Delta m} = \{\phi_i\}^T ([M(x,y,z)] + [\Delta m(x,y,z)])\{\phi_i\},$$

where $k(x,y,z)$, $M(x,y,z)$ are the global stiffness of the mechanical component based on its three-dimensional geometry (x,y,z) and mechanical properties like Young's modulus (tensile modulus), Poisson's ratio and material density depending on other physical parameters, like temperature T and rotational speed $\Omega$. In the aforementioned equations (3)-(4) the vector $\{\phi_1\}$ is the mode shape i (relative vibration of the system) obtained from the FE free vibration computation as it is given in the open literature.

The ice mass matrix $[\Delta m(x,y,z)]$ is evaluated from the field experience or by using multi-phrase CFD simulations to determine the building process upon the component of interest. Using the experimental and numerical approaches, a map of ice building-up process can be created with respect to the vibration behavior of the machine component of interest.

Since ice builds up on the rotating compressor blade 3, its frequency decreases and coincides with the nearest harmonic on non-harmonic excitation. For instance, the blade frequency $\omega_2$ of the rotating blade with ice comes in resonance with $3\omega$ engine order or $(\epsilon+2\Omega)$ at the nominal speed $\Omega$.

Figure 2:
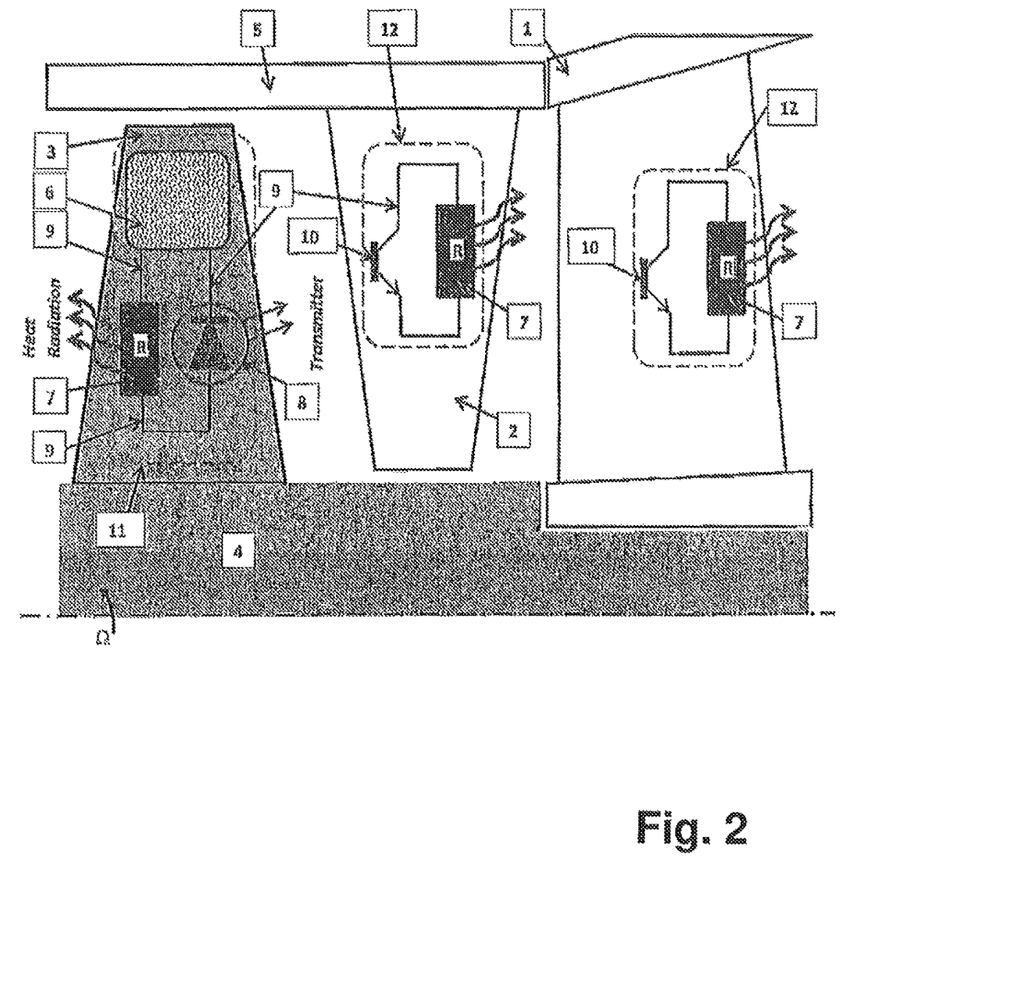
FIG. 2 shows in more detail an intake area of an axial compressor according to a first embodiment of the present invention.

FIG. 2 illustrates an embodiment of a device for suppressing ice formation on the structures (1, 2, 3) of an axial compressor intake according to the present invention. This compressor may be an integral part of a stationary gas turbine plant. The compressor comprises the casing 5 and the rotor 4. In general, axial compressors are multi-stage turbomachines with a number of rows of rotating blades, connected to the rotor 4, and stationary vanes, connected to the casing 5. FIG. 2 schematically shows the first compressor stage with the inlet guide vanes 2 and the rotating blades 3 on rotor 4. Between casing 5 and rotor 4 an annular flow channel is arranged to compress air, which enters the compressor via the bellmouth 1. At least one compressor blade 3 is instrumented with a piezoelectric element 6, which is firmly embedded within the airfoil of the at least one blade 3, e.g. by brazing or welding. Within the blade 3 the piezoelectric element is connected to a circuit 11 including a resistor 7 and a transmitter 8.

During operation the frequency of the rotating blade 3 with ice coincides the harmonic and/or non-harmonic excitation and the airfoil begins to vibrate. The vibrations are transformed as mechanical energy onto the piezoelectric element 6, the deformation of which generates an electrical voltage. As a consequence an electrical current flows within the circuit 11 through resistor 7 and transmitter 8. Resistor 7 generates heat to warm the rotating blade 3. Transmitter 8, designed for a contactless energy transfer, sends a part of the energy, generated by the piezoelectric element 6, via a receiver 10 to an electrical circuit 12, embedded within vane 2 and bellmouth 1. Circuits 12 in vane 2 and bellmouth 1 are equipped with said receiver 10 for receiving energy from transmitter 8 and with a resistor 7 for converting the received energy into heat.

All resistors 7 have to generate thermal energy which is equal to latent heat needed to transform the ice from the solid state to the liquid state, what can be determined on basis of field experiences or obtained from CFD analyses.

The generation of thermal energy can be controlled by a volume of the piezoelectric material 6, embedded within the blade and the resistor values.

In accordance with an additional embodiment of the invention circuits 11 with elements of piezoelectric material 6 can also be embedded into some or all vanes 2 and/or in the structures of the bellmouth 1, since resonance vibrations are expected for these structures under "ice condition" too.

Moreover, these non-rotating structures 1, 2 can be designed to the resonance case for the "ice operation" condition.

Figure 3A:
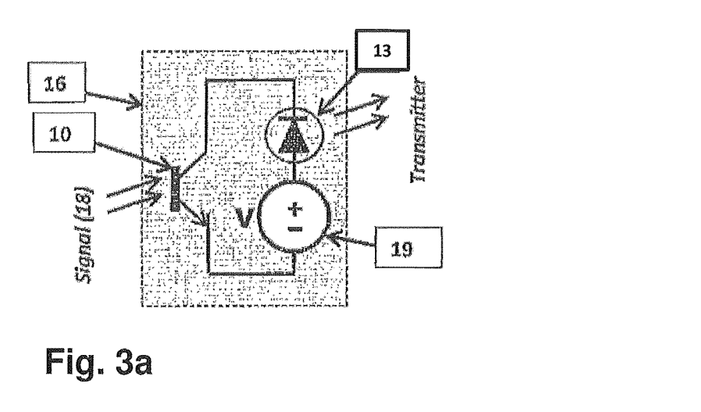
FIG. 3a, 3b illustrate alternative embodiments of the invention.
Figure 3B:
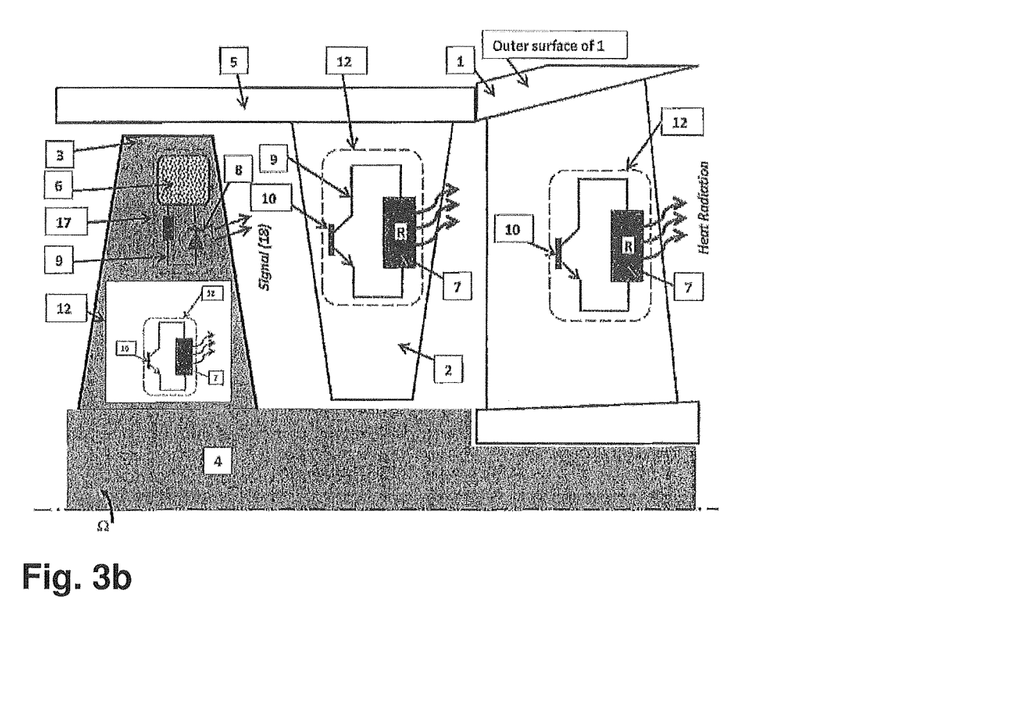
Figure 4:
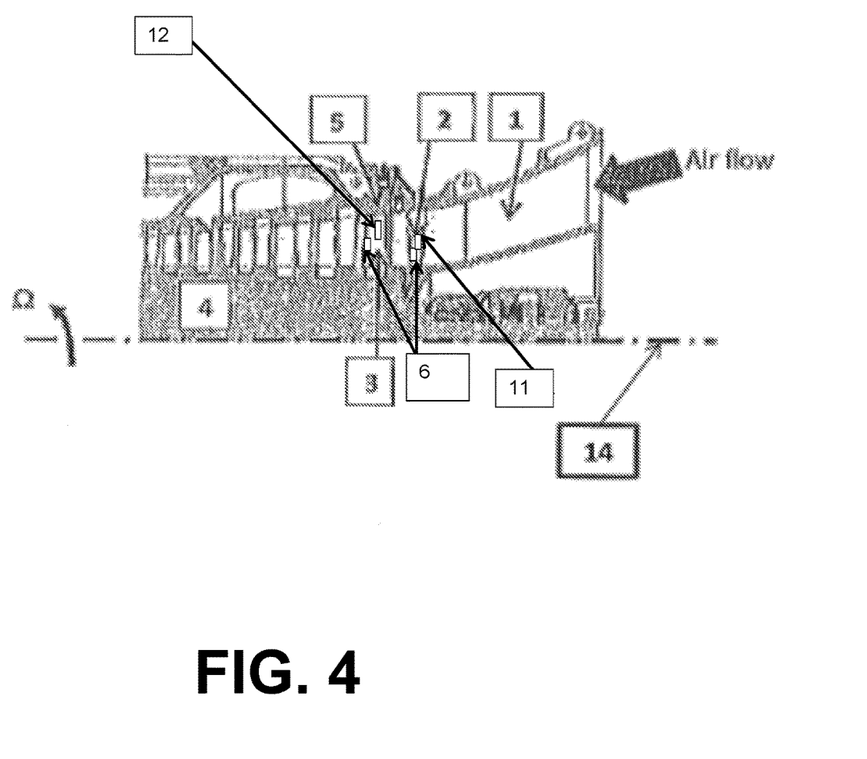
FIG. 4 illustrates a schematic view of an intake of an embodiment of an axial compressor having piezoelectric elements.

If the energy generated by the piezoelectric element 6 due to the vibration amplitudes of the blade 3 is too small or lasts too shortly for effective heating the relevant structures 1, 2, 3, a further embodiment of the invention is proposed, based on the use of an additional external energy delivery device 16, as shown in FIGS. 3a and 3b. In this case, a number of rotating blades 3, e.g. one to five, are instrumented with an piezoelectric element 6, wherein this element acts as a detector of ice formation. Since the instrumented rotating blade 3 begins to vibrate at the resonance frequency of interest, the embedded piezoelectric element 6 generates an electric voltage with a resulting current in the connected electrical circuit 17. In dependence of this current parameters transmitter 8 sends a signal 18 to a receiver 10' of said external energy delivery device 16. Besides the receiver 10' the external energy device 16 consists of a power system 14 for delivering electrical energy and a transmitter 13 for transmitting this energy to a receiver 10 of heating circuit 12. Additional elements can be enclosed in this external energy delivery device 16 depending on the design and function requirements, like energy storage, energy harvesting and others that might improve the performance of the entire system. The transmitter 13 of the external energy device 16 sends the electrical energy wireless to all receivers 10 of heating circuits 12 that are embedded in those structures, which are at the risk of ice formation, such as bellmouth 1, stator vanes 2, rotating blades 3, as illustrated in FIG. 3b. Depending on design and loading requirements, the circuits 12 may be attached onto the outer or inner surfaces of the structures 1, 2, 3 or embedded within the wall of these structures. By the resistors 7 of circuits 12 the received electrical energy is converted into thermal energy which melts the ice from the instrumented structure. Instead of the resistors 7 other equivalent elements may be applied for enhancing this process.

As known per se, see e.g. the referred CH 704 127, additional electrical components, like inductors and capacitors, can be used to increase the energy flow, e.g. by forming a resonant circuit.

The thermal energy generating resistor 7 in circuit 11 in the rotating blades 3 can be omitted, if the heat, generated by the upstream non-rotating structures 1, 2 is large enough to warm the passing air to such a degree that the ice formation on the surfaces of the downstream structures is suppressed.

In addition, different resonance frequencies of the structures at risk can be taken into account. Within one structure 1, 2, 3 more than one piezoelectric element 6 according to the invention can be used, wherein those piezoelectric elements 6 are adjusted to one or more resonance frequencies.

The transmission of energy within and among circuits 11, 12, 16, 17 may be passed in an analog manner as well as by using inductive, capacitive, electromagnetic phenomena and in digital form, if possible. Connections among piezoelectric material 6, resistor 7, transmitter 8 and receiver 10 and other elements not specified here, can be linked by wires 9, but alternatively can be wireless.

The assembly of these systems within the structures of interest can be done using different joining technologies, such as brazing, welding, glue and others. More details about the assembly techniques and locations of the piezoelectric material 6 are disclosed in the mentioned publication CH 704127. The piezoelectric material 6 can be applied to low, moderate and highest vibration strains of one modeshape or more mode-shapes. The superposition of all these vibrations can be taken into account to optimize a position of the piezoelectric element concerning the best lifetime behavior of the entire system. If there is an option, the described devices 11, 12, 17 can be applied onto the outer and/or onto the inner surface of the respective structures 1, 2, 3 or embedded in the wall of these structures as may be appreciated from FIGS. 2, 3a, 3b, and 4.

The system according to the invention activates itself, when ice deposits on the surface of a structure, the frequency of which is then reduced. But other mechanisms of activation of the inventive system can be taken into account, e.g. higher centrifugal loading acting upon the airfoil due to additional mass of ice.

In addition, the system according to the invention can be activated by changing the rotational speed Ω of the machine which is an essential parameter for the machine operating with variable rotational speed. Then, the system is semicontrolled and activated by monitoring the conditions of ice creation and/or detects ice building-up or concerning ambient condition determined by ambient temperature and/or pressure. Also, other parameters that have an impact on the machine performance can be used for detecting and changing the rotational speed and then activating the ice suppressing system according to the invention.

Finally, it is worth to be mentioned that the solution according to the invention doesn't have an impact on the compressor performance and it only requires a negligible amount of electrical energy.

The invention claimed is:

1. A method for suppressing ice formation on a surface of at least one turbomachine structure during operation of the turbomachine, the method comprising:
    converting mechanical vibratory energy of at least one first structure of the turbomachine into electrical energy via at least one piezoelectric element connected to the structure,
    wirelessly transmitting a signal based on the electric energy converted from the mechanical vibratory energy of the at least one first structure,
    receiving the signal by at least one heat generating circuit attached to at least one second structure of the turbomachine,
    generating, by the heat generating circuit, thermal energy from the signal received by the heat generating circuit, and
    conducting the thermal energy generated via the heat generating circuit to a second structure of the turbomachine to which the heat generating circuit is attached to suppress ice formation on the second structure to which the heat generating circuit is attached.

2. The method according to claim 1, wherein mechanical vibrations of the structure result in deforming the at least one piezoelectric element to convert the mechanical vibratory energy of the at least one first structure into an electrical voltage to initiate an electrical current in an electrical circuit connected to the at least one piezoelectric element, the method also comprising:
    converting the electrical current into thermal energy by an ohmic resistor of the electrical circuit and conducting this thermal energy to the at least one first structure.

3. The method according to claim 1, comprising:
    a transmitter of an external energy delivery system transmitting the signal to transmit power by contactless energy transfer to at least one receiver of the heat generating circuit.

4. The method according to claim 1, wherein the heat generating circuit is an electrical circuit that comprises a receiver and a resistor that is connected to the receiver so that the resistor generates heat from the signal received by the heat generating circuit via the receiver of the heat generating circuit.

5. The method according to claim 1, wherein more than one piezoelectric element is coupled to the at least one first structure, the method comprising:
    adjusting the piezoelectric elements to one or more resonance frequencies.

6. The method according to claim 1, wherein the turbomachine is a compressor of a stationary gas turbine plant for power generation.

7. The method according to claim 1, comprising: coupling the at least one piezoelectric element to said at least one first structure of the turbomachine and connecting each piezoelectric element to an electrical circuit having an ohmic resistor.

8. The method according to claim 7, wherein the electrical circuit additionally comprises a transmitter.

9. The method according to claim 8, wherein the electrical circuit of the at least one first structure and the transmitter of the electrical circuit is configured to transmit the signal to transmit power by contactless energy transfer.

10. The method according to claim 9, wherein the at least one first structure is a rotating blade and the second structure is an inlet guide vane and/or a stator part of an intake of a compressor of the turbomachine.

11. The method according to claim 8, wherein the transmitter of the electrical circuit sends the signal to a receiver of an external energy delivery system.

12. The method according to claim 11, wherein the external energy delivery device comprises at least the receiver, an electrical power source and a transmitter for contactless energy transfer configured to transmit the signal.

13. The method according to claim 12, wherein the transmitter of the external energy delivery system transmits the signal to transmit power by contactless energy transfer to at least one receiver of the heat generating circuit, the heat generating circuit being configured as an electrical circuit.

14. A device for conducting the method according to claim 1, the device comprising:

a casing with an intake section to receive an airflow;
a rotor surrounded by the casing,
a row of inlet guide vanes connected to the casing, and
a row of rotating blades connected to the rotor,
a piezoelectric element and an electrical circuit connected to the piezoelectric element, the piezoelectric element connected to one of an inlet guide vane of the row of inlet guide vanes and a rotating blade of the row of rotating blades, and
wherein the electrical circuit is configured to wirelessly transmit a signal for sending to at least one of: heat generating circuits connected to the inlet guide vanes and heat generating circuits connected to the rotating blades, the signal configured to facilitate actuation of the heat generating circuits for the generation of heat to suppress ice formation.

15. The device according to claim 14, wherein the piezoelectric element is connected to the electrical circuit such that vibrations due to ice formation deform the piezoelectric element to generate an electrical voltage to cause the electrical circuit to wirelessly transmit the signal.

16. The device according to claim 14, wherein the electrical circuit is attached to an outer surface or an inner surface of a structure of a turbomachine or is embedded within the structure of the turbomachine.

17. The device according to claim 14, wherein the electrical circuit includes at least one resistor or at least one ohmic resistor.

18. The device according to claim 14, wherein the electrical circuit comprises at least a transmitter.

19. The device according to claim 18, wherein the electrical circuit is connected to the casing, the rotating blade of the row of rotating blades, or the inlet guide vane of the row of inlet guide vanes.

20. The device according to claim 19, wherein the electrical circuit is connected to the rotating blade of the row of rotating blades.

21. The device according to claim 19, wherein a transmitter of the electrical circuit is designed to send the signal to receivers of the heat generating circuits connected to the inlet guide vanes and receivers of the heat generating circuits connected to the rotating blades.

22. The device according to claim 14, comprising: an external energy delivery system that comprises a receiver for receiving the signal, an electrical power source and a transmitter for contactless energy transfer transmission to the heat generating circuits connected to the rotating blades and the heat generating circuits connected to the inlet guide vanes.

23. The device according to claim 22, wherein each of the heat generating circuits comprises an electrical circuit that comprises a receiver connected to a resistor.

24. The device according to claim 14, wherein the piezoelectric element and the electrical circuit connected to the piezoelectric element are designed as a module.

25. The device according to claim 24, wherein the module additionally comprises an ohmic resistor and/or a transmitter.

* * * * *